5 Sheets—Sheet 4.
T. S. HALL.
Electro Magnetic Railroad Signal.
No. 232,025. Patented Sept. 7, 1880.
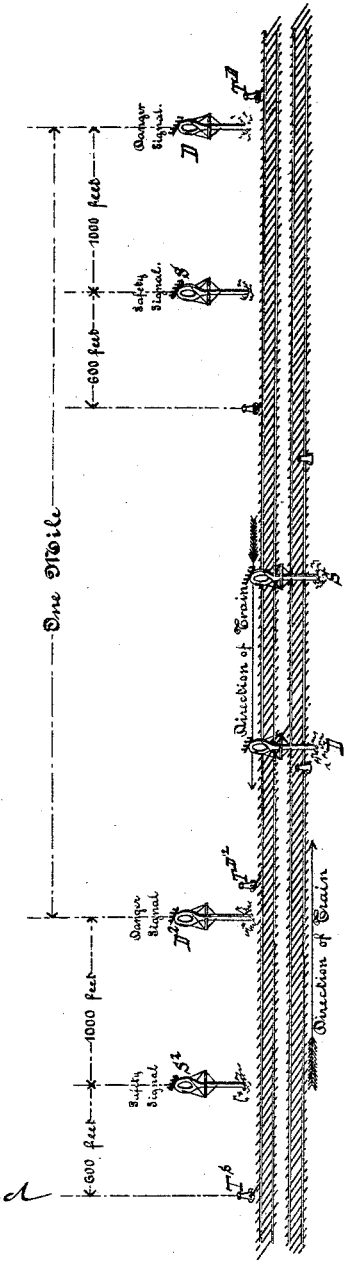
Witnesses.
Otto Hufeland
Wm Miller.
Inventor.
Thomas S. Hall
by
Van Santvoord & Hauff
his attorneys.

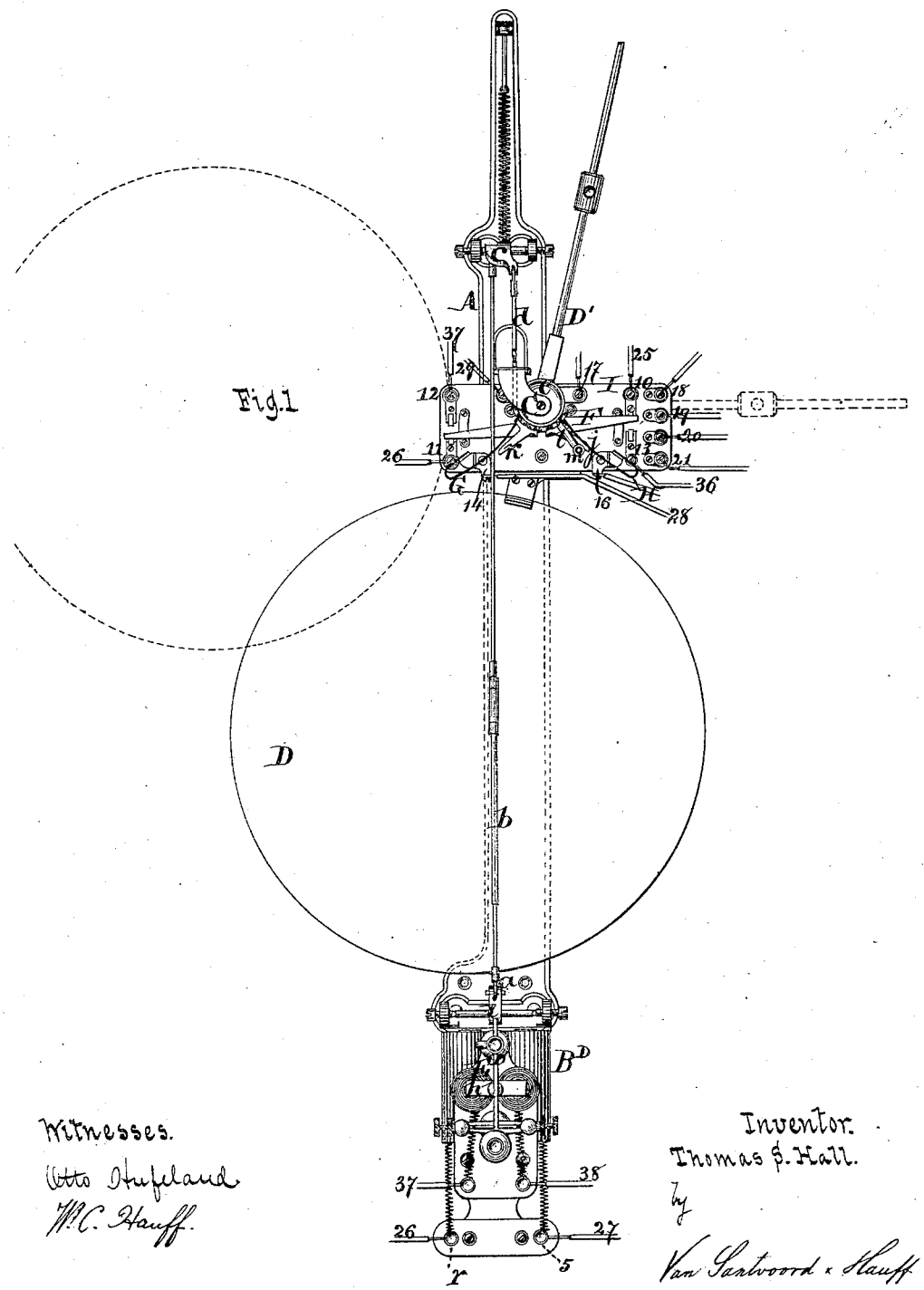

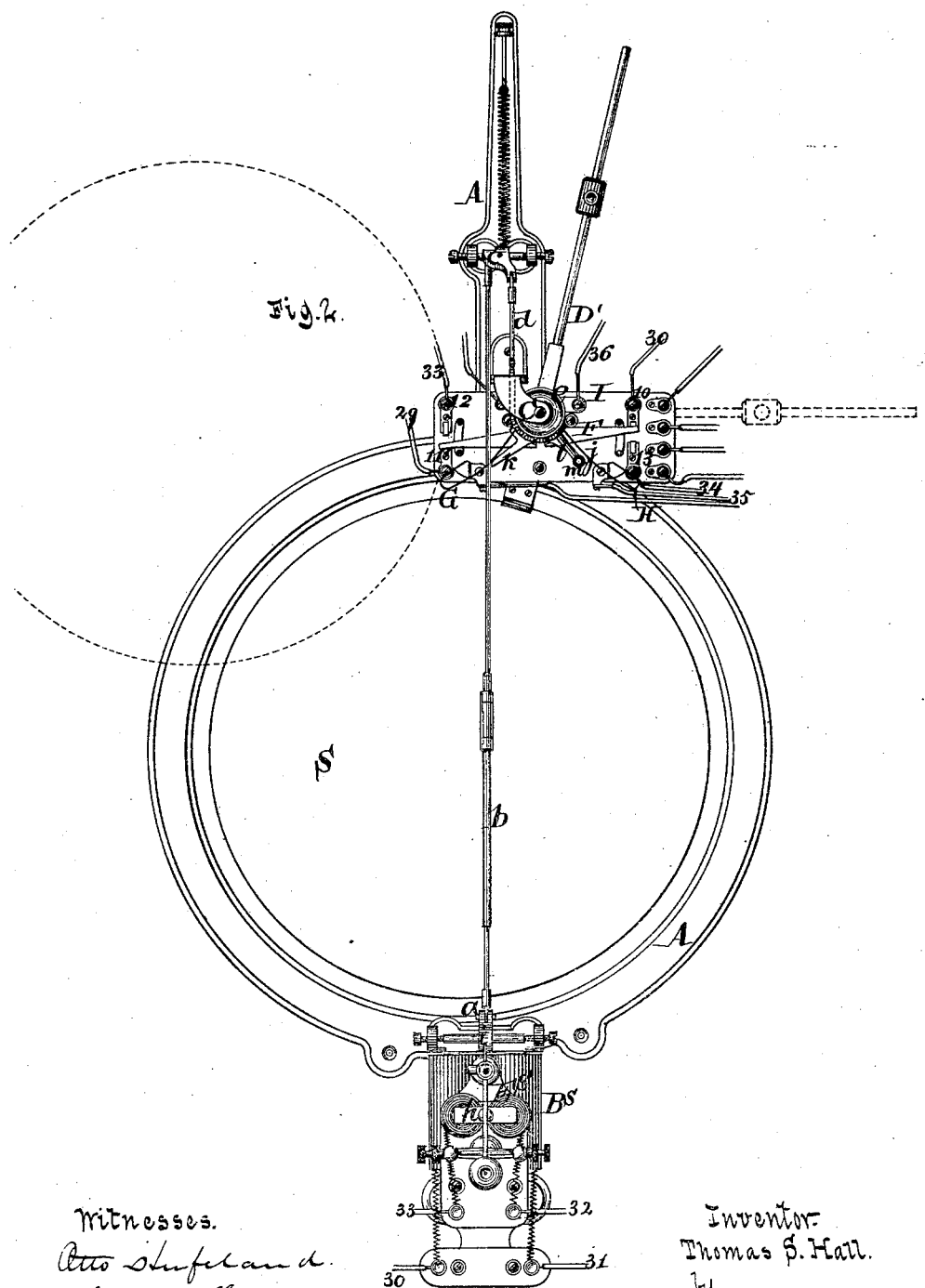

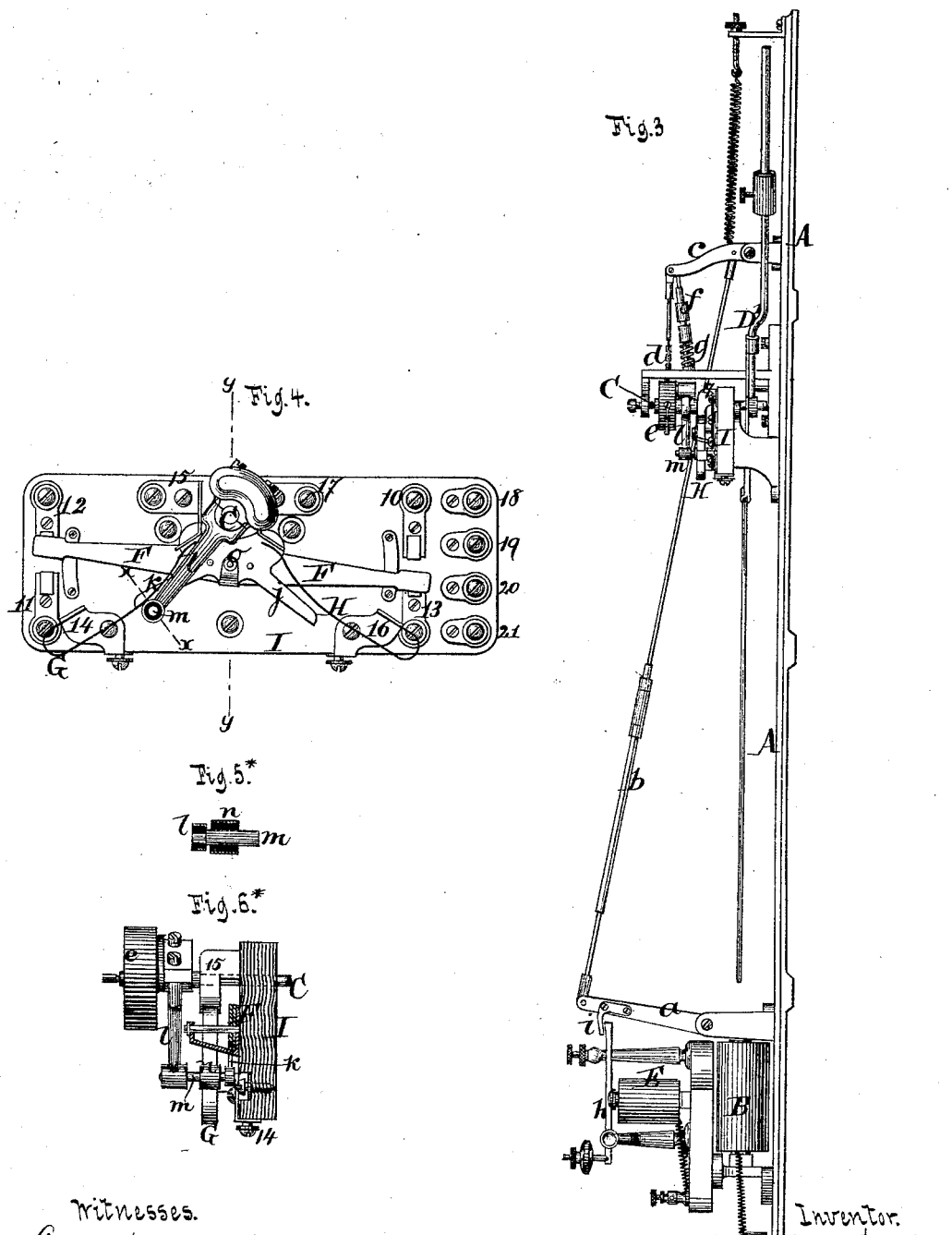

T. S. HALL.
Electro Magnetic Railroad Signal.
No. 232,025.    Patented Sept. 7, 1880.
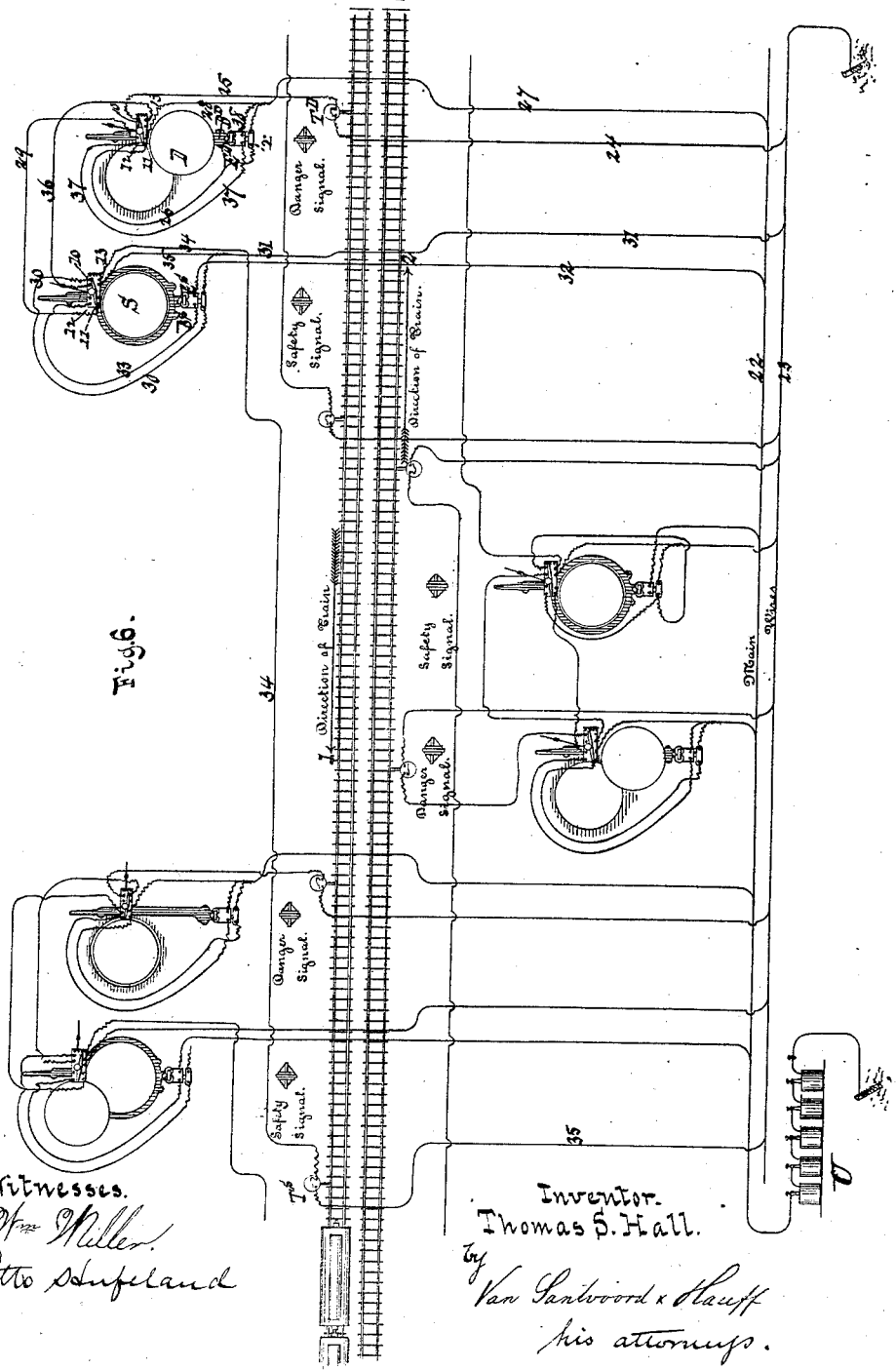

UNITED STATES PATENT OFFICE.

THOMAS S. HALL, OF BRATTLEBOROUGH, VERMONT.

ELECTRO-MAGNETIC RAILROAD-SIGNAL.

SPECIFICATION forming part of Letters Patent No. 232,025, dated September 7, 1880.

Application filed November 22, 1878.

*To all whom it may concern:*

Be it known that I, THOMAS S. HALL, of Brattleborough, in the county of Windham and State of Vermont, have invented a new and useful Improvement in Electro-Magnetic Railroad-Signals, which improvement is fully set forth in the following specification, reference being had to the accompanying drawings, in which—

Figure 1 represents a front elevation of a danger-signal apparatus containing my invention. Fig. 2 shows a similar view of a safety-signal apparatus. Fig. 3 is a side elevation of the apparatus shown in Fig. 1. Fig. 4 is a front view of the "cut-out" on a larger scale than the previous figures. Fig. 5* is a detached section of the cut-out. Fig. 6* is a sectional side view of the cut-out. Fig. 5 is a perspective view of a double railroad-track provided with my system of signals. Fig. 6 is a diagram illustrating the connection of the various parts of my signal apparatus with each other and with a galvanic battery.

Similar letters indicate corresponding parts.

This invention relates to that class of electro-magnetic signal apparatus for which Letters Patent were granted to me conjointly with George H. Snow, August 22, 1876, No. 181,435; and it consists in certain novel combinations of parts, whereby the circuit through the helix of the electro-magnet by which the signal is operated is automatically broken when the signal has been raised, a second circuit, adapted for vitalizing another electro-magnet, being at the same time closed, and one or more circuit-closing keys, adapted to close separate circuits, being operated before the signal which has been raised comes to a state of rest; further, in the combination of two signals, one of which is termed the "danger-signal" and the other the "safety-signal," and with two circuit-closers or track-instruments, one of which is termed the "raising track-instrument" and the other the "reversing track-instrument," of two cut-outs, each containing a shifting-arm and a spring-key, which are actuated one by the lever of the danger-signal and the other by the lever of the safety-signal, and of suitable connections with the raising and reversing magnets of the two signals, and with a battery, so that by means of the shifting-arms of the cut-outs the circuit which is closed by means of one of the circuit-closers or track-instruments, and which serves to raise or reverse one of the signals, is broken as soon as the signal has completed its movement, and another circuit is closed for actuating the other signal, each signal, after it has been raised or reversed, leaving the shifting-arm of its cut-out in the proper position to reverse the motion of said signal.

In the drawings, the letter A designates the frame supporting the parts of either the danger-signal or the safety-signal apparatus shown in Figs. 1 and 2. By comparing these two figures it will be found that the only difference in the construction of the two devices is in the shape of a portion of the frame A, the frame of the danger-signal apparatus being of a straight narrow shape, while the frame of the safety-signal is constructed with a rim to surround the safety-signal disk S. The object of this difference in the shape of the frames of the two devices is to accommodate them to the different manner or position in which they are placed in their respective cases relatively to the window through which their signal-disks D or S are displayed, the two devices being placed in their cases in such a manner that when their disks are in their normal positions, as shown in full lines in Figs. 1 and 2 of the drawings, the danger-signal D is concealed, while the safety-signal is exposed, and vice versa.

The disks D and S are raised each by the action of an electro-magnet, $B^D$ or $B^S$, on an armature, $a$, which transmits motion to a rod, $b$, lever $c$, chain $d$, and chain-wheel $e$, the latter being secured on a shaft, C, on which is also secured the signal-lever D', so that by turning said chain-wheel the signal-disk is raised and the lever D' is brought from its normal inclined position to a horizontal position, as indicated in dotted lines in Figs. 1 and 2.

The rod $b$ is preferably made elastic, as described in my Patent No. 150,030, dated April 21, 1874.

The outer end of the lever $c$, to which the chain $d$ and elastic rod $b$ are connected, rests on a pin, $f$, (see Fig. 3,) when the signal-disk is in its lower position, and this pin is pressed upward by the action of a spring, $g$, while its position is adjustable, so that the position in which the signal-disk D or S will rest when down can be regulated.

When the disks D and S have been raised they are retained by the action of the armature $h$ of an electro-magnet, $E^D$ or $E^s$, said armature being weighted, so that when it is allowed to follow its own action it bears against a toe, $i$, on the armature-lever $a$ of the raising-magnet $B^D$ or $B^s$, and as soon as this lever has been raised the armature $h$ drops beneath the toe $i$, thereby retaining the signal-disk in its raised position until the releasing-magnet $E^D$ or $E^s$ is vitalized, when the armature $h$, being attracted by said magnet, releases the armature-lever $a$, permitting the signal-lever to follow its inherent gravity and to descend to its lower position.

With each of the signal-houses is combined a cut-out, detached views of which are shown in Figs. 4 and 5*. This cut-out consists, essentially, of a shifting-arm, F, which has its fulcrum on a pin, $o$, Fig. 4, and is provided with two tappet-arms, $j$ $k$. On the shaft C of the signal-lever D' is secured an arm, $l$, having an insulated pin or projection, $m$, and when the signal-disk D or S is moved to its lower position this pin or projection strikes the tappet-arm $j$ of the shifting-arm F (see Figs. 1 and 2) and throws the same in the circuit of the raising-magnet $B^D$ or $B^s$, while when the signal-disk is moved to its upper position the pin $m$ strikes the tappet-arm $k$, (see Fig. 4,) and the shifting-arm F is thrown in the circuit of the raising-magnet $E^D$ or $E^s$, as will be hereinafter more fully explained.

The elastic rod $b$ allows the signal-lever D' to oscillate before coming to a state of rest either when the signal is raised or lowered. This movement of the signal-lever does not affect the shifting-arm F after its position has been changed; but it serves to close temporarily other circuits by means of two keys, G and H, which are composed of elastic strips of sheet metal, the key G being rigidly fastened at one end to a plate, 14, while its other end, when it is in a quiescent state, is situated a short distance away from a plate, 15. (See Fig. 4.) When the signal is raised and oscillates, as before stated, the pin $m$ of the arm $l$ strikes the key G and throws its free end in momentary contact with the plate 15, such contact being repeated three or four times, or as often as the signal-lever oscillates, while when the motion of said lever ceases the key G assumes its position of rest and its free end is left out of contact with the plate 15.

The key H is fastened at one end to a plate, 16, and its free end is contiguous, but not in contact, with a plate, 17. When the signal descends and describes its oscillations the free end of said key is brought in contact several times with the plate 17.

The circuit closed by the key G can be used to strike bells, raise other signals, or for any other purpose. On the danger-signal apparatus, Fig. 1, said key G is used to close a circuit through the raising-magnet $B^s$ of the safety-signal apparatus, Fig. 2, as will be hereinafter more fully explained, so that when the danger signal is raised to its displayed position the safety-signal will be raised to its concealed position. On the safety-signal apparatus, Fig. 2, the key G is used to close a circuit for striking bells at a station-crossing or other place; but it may also be used for other purposes—as, for instance, to lock a double-circuit instrument, to keep a bell continuously ringing with a local battery, or for raising or reversing some other signal.

The key H on the safety-signal apparatus, Fig. 2, is used to close a circuit through the reversing-magnet $E^D$ of the danger-signal apparatus, as will be hereinafter more fully explained, so that when the safety-signal is reversed and falls to its exposed position the danger-signal is caused to fall to its concealed position. On the danger-signal apparatus the key H can be used to strike a bell for giving notice that the signal has been reversed; or it may be used for other purposes—as, for instance, to unlock a double-circuit instrument, and thus stop a bell ringing which may have been set ringing by the key G of the safety-signal apparatus.

The insulated pin or projection $m$ is secured to the arm $l$ as follows: In the free end of the arm $l$ is formed a hole, into which a piece of hard rubber or other insulating material is forced, and centrally through this piece of rubber a hole is made, into which the pin or projection $m$ is inserted. That part of the pin $m$ which comes in contact with the circuit-closing keys G and H is provided with an insulator, $n$, (see Fig. 5*,) having the form of a button, which is made of hard rubber, ebonite, or other like material, and inclosed in a thin metallic ring.

The cut-out, with its shifting-arm F and keys G H, is supported by a panel, I, which is made of wood or like material, and is secured to the main frame A in any suitable manner.

To the panel I are secured supplementary clamping-screws 18, 19, 20, and 21, which are intended to be used in connecting up the circuits, and which connect with the plates 10, 11, 12, and 13; and in the subsequent explanation of the circuit-connections the supplementary clamping-screws will be disregarded.

In Fig. 5 I have illustrated the position of my signals D S $D^2$ $S^2$ and track-instruments $T^D$ $T^s$ $T^{D2}$ in relation to a railroad-track, and in Fig. 6 the connection between the track-instruments, the battery-wires, and the signal apparatus is shown. From this figure it will be seen that from one pole of the battery U extends a wire, 22, the entire length of the railroad track or section to be controlled by my signals. A wire, 23, runs parallel to the wire 22, and connects with the earth at the distant station. The second pole of the battery U connects with the earth. The track-instrument $T^D$ connects at one side, by a wire, 24, with the line-wire 23, and from the opposite side of said track-instrument extends a wire, 25, to the plate 10 in the cut-out of the danger-signal D. From the plate 11 of this cut-out extends a wire, 26, to a clamping-screw, r, which connects with one end of the helix of the raising-magnet B^D. (See Fig. 1.) The other end of this helix connects with a clamping-screw, 5, from which extends a wire, 27, to the line-wire 22.

If a train of cars moves on the track in the direction of arrow 1, (marked near the track in Fig. 6,) and one of the wheels strikes the track-instrument T^D, a circuit is closed through wires 22 27, helix B^D, wire 26, plate 11, shifting-arm F, plate 10, wire 25, track-instrument T^D, wires 24 and 23 to the ground, and through the ground back to the battery, the electro-magnet B^D is vitalized, and the danger-signal D is raised in sight. As soon as this signal has been raised the shifting-arm F is thrown off from the plates 11 and 10 and the circuit above pointed out is broken.

At the same time said shifting-arm F is brought in contact with the plates 12 and 13, ready for the reversing-circuit.

As the danger-signal reaches its elevated position the pin m on the arm l strikes the key G, and a circuit is closed through battery-wire 22, wires 27 and 28, key G, wire 29, shifting-arm F of safety-signal apparatus, wire 30, helix of electro-magnet B^s, Fig. 2, wires 31 and 23 to the ground, and through the ground back to the battery, the electro-magnet B^s is vitalized, and the safety-signal S is raised to its concealed position, leaving the shifting-arm F of the safety-signal apparatus in contact with the plates 12 and 13.

When the train strikes the reversing track-instrument T^s a circuit is closed through battery-wire 22, wire 32, helix of reversing-magnet E^s, Fig. 2, wire 33, shifting-arm F of the safety-signal apparatus, (which was left in contact with plates 12 and 13,) wire 34, track-instrument T^s, wires 35 and 23 to the ground, and through the ground back to the battery. The safety-signal returns to its exposed position, the shifting-arm in the safety-signal apparatus is brought back in contact with plates 10 and 11, (the circuit just pointed out being broken,) and the pin m in the arm l of the safety-signal lever strikes the key H. By this key a circuit is closed by the battery-wire 22, wires 27 and 38, helix of reversing-magnet E^D, Fig. 1, wire 37, shifting-arm F of danger-signal apparatus, (which was left in contact with plates 12 and 13,) wire 36, key H, wires 35, 31, and 23 to the ground, and through the ground back to the battery, and the danger-signal drops back to its concealed position, throwing the shifting-arm F of its cut-out in contact with plates 10 and 11.

From this description it will be seen that the circuit which serves to raise the danger-signal is broken as soon as said signal has reached its elevated position, the shifting-arm F being thrown off from the plates 10 and 11 and moved in contact with the plates 12 and 13, ready for the reversing-circuit. At the same time, by the action of the lever of the danger-signal on the key G in the cut-out of the danger-signal apparatus, another circuit is momentarily closed through the raising-magnet of the safety-signal, and this last-named signal is raised out of sight, the shifting-arm of the cut-out in the safety-signal apparatus being brought in position for the reversing-circuit. By these means all waste of battery-power is avoided. Furthermore, the safety-signal is changed from a signal of danger to a signal of safety by the movement or action of the danger-signal, and the danger-signal is put in the position of safety or concealed from sight by the safety-signal being put in the position of danger or displayed; or, in other words, the safety-signal cannot show "safety" until the danger-signal shows "danger," and the danger-signal cannot show "safety" until the safety-signal shows "danger," and thus the system is made perfect for the security of trains under all circumstances.

What I claim as new, and desire to secure by Letters Patent, is—

1. The combination, with a semaphoric signal and with two electro-magnets, one for raising and the other for reversing said signal, of a shifting-arm, F, which is automatically moved by the signal, and of two pairs of points of contact, 10 11 and 12 13, so that when the signal is raised said shifting-arm forms part of the circuit which vitalizes the reversing-magnet, and when the signal is down it forms part of the circuit which vitalizes the raising-magnet, substantially as set forth.

2. The combination, with a semaphoric signal and with two electro magnets, one for raising and the other for reversing said signal, of a cut-out composed of a shifting-arm, one or more spring-keys, two pairs of points of contact for the shifting-arm, and one point of contact for each of the spring-keys, said shifting-arm and spring key or keys being actuated by a pin or projection secured to the signal, whereby, at the moment the signal is raised or lowered, the circuit of the raising or reversing magnet is broken, and another circuit is closed temporarily by the action of said projection on one of the spring-keys, substantially as described.

3. The combination, in an electro-magnetic railroad-signal apparatus, of two signals, D S, a raising and a reversing magnet for each signal, two cut-outs, one for each signal, each containing a shifting-arm, F, and two pairs of contact-plates, 10 11 and 12 13, forming terminals for the circuits of the raising and reversing magnets of its signals, respectively, and a spring-key adapted to temporarily close the circuit of the reversing-magnet of the other signal, said shifting-arms and spring-keys being adapted to be actuated by their respective signals, and two track-instruments or circuit-closers, one for raising and the other for reversing the signals by the action of a passing train of cars, and of suitable connections with the raising and reversing magnets of the two signals, the track-instruments or circuit-closers, and with a galvanic battery, whereby the circuit, which is closed by means of one of the circuit-closers or track-instruments, and which serves to raise or reverse one of the signals, is broken as soon as the signal has completed its movement, and another circuit is closed for actuating the other signal and each signal after it has been raised or reversed, leaving the shifting-arm of its cut-out in the proper position to reverse the motion of said signal, substantially as set forth.

4. The combination, with an electro-magnet and signal-lever operated thereby, of a shifting arm or key, F, which is situated in the circuit of said magnet, and is operated by the action of the signal-lever and contact-plates forming the terminals of said circuit and lying in the paths of the opposite ends of said arm or key, and adapted to be bridged thereby when the signal is in its concealed position, so that the said circuit-controlling lever or key is in a position to close said circuit, and vice versa, substantially as hereinbefore set forth.

5. The combination, with an electro-magnet and signal-lever operated thereby, of a shifting arm or key, F, having the arms $j$ $k$ and a swinging arm, $l$, which partakes of the motion of the signal-lever and engages with said arms of the shifting arm or key, substantially as and for the purpose hereinbefore set forth.

6. The combination, with a danger-signal and its displaying magnet and circuit and a safety-signal and its concealing magnet and circuit, of devices adapted to be operated by either of said signals to simultaneously break the circuit of the displaying-magnet of the danger-signal and close the circuit of the concealing-magnet of the safety-signal, or vice versa, and suitable positive stops for retaining said signals in their said displayed and concealed positions, respectively, substantially as described, and for the purpose set forth.

7. The combination of a shifting arm or key, F, contact-plates 10, 11, 12, and 13, forming the terminals of the raising and reversing circuits, respectively, one or two circuit-closing keys, G H, adapted to close one or more additional circuits, a signal-lever, which is arranged to oscillate before coming to a state of rest, and is adapted to operate both said shifting-arm and the circuit-closing key or keys, and an electro-magnet for operating the signal-lever, substantially as hereinbefore set forth.

8. The combination of a shifting arm or key, F, having the arms $j$ $k$, one or two circuit-closing keys, G H, a signal-lever arranged to oscillate before coming to a state of rest, a swinging arm, $l$, which partakes of the motion of the signal-lever and engages with both the shifting-arm and the circuit-closing key or keys, and an electro-magnet to operate the signal-lever, substantially as hereinbefore set forth.

In testimony that I claim the foregoing I have hereunto set my hand and seal this 17th day of July, 1878.

THOMAS S. HALL. [L. S.]

Witnesses:
W. HAUFF,
E. F. KASTENHUBER.